3,085,393
ROCKET ENGINE STARTING METHOD
Chauncey J. Hamlin, Jr., Pasadena, Calif., assignor to
North American Aviation, Inc.
Filed June 3, 1958, Ser. No. 739,514
6 Claims. (Cl. 60—35.3)

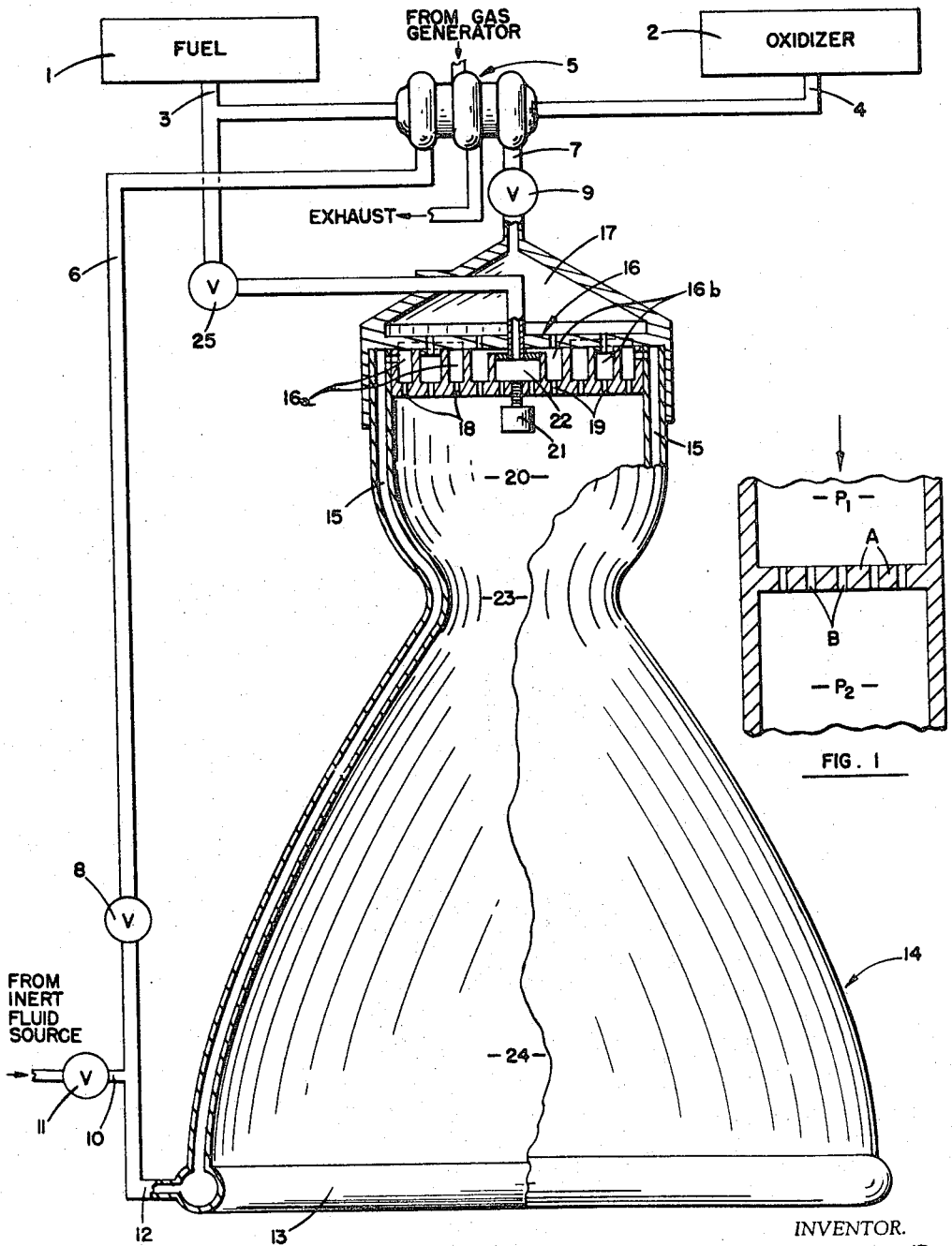

The present invention is directed to a method for achieving a combustion instability-free rocket engine start and more particularly to a starting method wherein an inert fluid is placed in the fuel lines of a rocket engine and ejected therefrom ahead of the fuel, producing an inert purge and a vibration free fuel injection.

Probably the most difficult feat to accomplish in large rocket engine operation is the start, or initiation of combustion. A phenomenon known as combustion instability or combustion vibration is commonplace in this starting procedure. It continually plagues rocket engineers in their design of injectors and in their attempts to achieve starts without the development of undue vibrational characteristics. If this tendency toward instability is not adequately controlled during the early operational phases it sometimes becomes aggravated and lends to operational inefficiency, structural damage or complete engine destruction.

Combustion instability frequently results during starts in which combustion chamber pressure rises gradually over a period of several seconds, probably because the injector pressure drop, $\Delta P$ (to be discussed more fully hereinafter), is momentarily too low during thrust build-up. A rocket engine starting method known as a full-flow start has been developed in an attempt to reduce this low $\Delta P$ operating time to a minimum. In that start the oxidizer valve and the fuel valve are opened to the full open position substantially simultaneously after a predetermined ignition condition has been reached. Both propellants then rush at full-flow to the injector and mainstage combustion begins almost immediately after the arrival of fuel at the combustion chamber. While this starting method has been relatively successful in reducing the time in which $\Delta P$ is too low there still exist several dangerous or potentially dangerous conditions which lessen its desirability. It is in the elimination of these conditions that the present invention is of value.

This invention is peculiarly adaptable to engines of the regeneratively cooled variety. Therein one of the propellents, usually the fuel, after leaving a main fuel valve is passed in rapid succession through coolant passages in the thrust chamber wall, and into the injector, from whence it is injected into the combustion chamber. The total distance traversed by the fuel before it reaches the injector is greater than that distance traversed by the oxidizer, since the oxidizer travels directly from a main oxidizer valve to the injector. The oxidizer therefore arrives at the injector before the fuel.

This time differential in the arrival of the fuel and oxidizer at the injector defines a propellent sequencing. And, since liquid oxygen (LOX) is the most commonly used oxidizer this propellent sequencing is commonly known as a LOX lead.

The LOX lead could be eliminated, if such was the desire, by proper propellent valve sequencing. However, due to the tendency of liquid oxygen to boil and form gas pockets in the injection system it is desirable in the full flow start that LOX be introduced to the in before the fuel. This allows the system to overcom boiling tendency of the LOX and establish LOX ful prior to fuel introduction. While this LOX lead is ficial in many respects an inherent disadvantage has tofore been forced upon the engine system by its use the relatively long time interval between the priming LOX side and the fuel side of the injector. L this time interval the fuel injector passages are empt it is possible for LOX to enter those passages throu fuel injector orifices, causing disturbances in the fu jector immediately prior to mainstage combustion. possibility of oxidizer back flow is made probable l aspirating effect of the full-flow injection of oxidize the combustion chamber. This, together with a cl of gases in the regenerative cooling passages due flow of liquid oxidizer into the combustion chamber a resultant gas contraction, causes a pressure depr in the fuel injector sufficient to suck oxidizer back through the fuel passages. The resultant condition be responsible for the triggering of high frequency bustion vibration during pressure build-up.

A second dangerous condition in the standard ful start is the tendency toward pressure reversals whi fuel passages are empty. Pressure surges occur fuel injector which, if out of phase with similar in the combustion chamber, result in certain instants the combustion chamber pressure is actually highe1 the fuel injector pressure. Engineers believe th; presence of these pressure fluctuations (rather that desirable abrupt pressure rise at the time of fuel ir priming) is due to the existence of an air cushion fuel inlet manifold at the chamber nozzle exit.

Also of potential danger in the full-flow starting n is the "flash back" tendency which sometimes occ the fuel injector during ignition before the fuel has a at the injector.

These negative conditions are all eliminated by t plication of the inert fluid full-flow starting method closed herein.

It is therefore an object of this invention to prov inert fluid full-flow rocket engine starting method will eliminate combustion instability problems ( propellant sequencing, pressure reversals and ii flash back.

Another object is to provide a rocket engine s method wherein the fuel system conduits are fille, an inert fluid prior to starting.

A further object is to establish a desirable fuel ii $\Delta P$ with an inert fluid prior to the arrival of fuel injector.

Yet another object is to eliminate rocket engine bustion instability through the hydraulic action ( on an inert fluid in the fuel lines during starting tra Still another object is to provide a rocket engine wherein the fuel injector and the oxidizer inject primed substantially simultaneously.

Other objects will become apparent from the fol description taken in connection with the accomp drawings in which;

FIG. 1 is a cross section of a simplified injecto1 trating $\Delta P$.

FIG. 2 is a schematic of a rocket engine system sl inert fluid in the fuel conduits preliminary to engine operation.

As used in rocket engine injector engineering the symbol ΔP may be defined as the pressure drop at a specific flow rate through a given orifice, however, since the present invention is not concerned with variations in propellent flow rate or injector orifice size these factors will be discussed only generally to illustrate the principle. In FIG. 1 an injector plate, representatively shown and designated as A, contains a series of orifices B. A fluid propellent enters the area above the injector from the direction indicated by the arrow and at a particular pressure, designated $P_1$. As the propellent traverses the injector orifice B the fluid pressure drops to a new pressure, $P_2$. The pressure differential between $P_1$ and $P_2$ is ΔP. This may be represented by the following equation.

$$P_1 - P_2 = \Delta P$$

A high ΔP requires a higher pumping head in the rocket engine system than does a low ΔP, hence, a greater flow of turbine-drive propellents in a turbopump system is also required. Alternately, in gas pressurized systems, higher gas pressures and, consequently, heavier pressure vessels must be used. A low ΔP is thus desirable from a standpoint of overall rocket engine efficiency. However, a low ΔP is usually accompanied by combustion instability. The lower ΔP operating limit is therefore often dictated by the point where combustion instability starts to become a destructive factor.

In a representative rocket engine system as seen in FIG. 2 fuel is stored in tank 1 and oxidizer in tank 2. Lines or conduits 3 and 4 lead from the fuel and oxidizer tanks respectively to a turbopump, generally designated as 5. Lines or conduits 6 and 7, during engine operation, carry pressurized fuel and oxidizer from turbopump 5 to main fuel valve 8 and main oxidizer valve 9. An inert fluid line or conduit 10 with a valve 11 therein is connected to fuel line or conduit 12 leading from main fuel valve 8 to a manifold 13 which is attached to a rocket engine thrust chamber, generally designated as 14. Thrust chamber 14 is provided with pasageways 15 in its walls for the purpose of regeneratively cooling the chamber. Passageways 15 connect manifold 13 to the fuel portion 16a of an injector 16. The oxidizer, in traversing the oxidizer system, follows a direct route from oxidizer valve 9 to a dome 17 above injector 16. It then passes into the oxidizer portion 16b of injector 16. From positions 16a and 16b the fuel and oxidizer are injected through fuel orifices 18 and oxidizer orifices 19 into combustion chamber 20. An igniter 21 (may be pyrotechnic or hypergolic fluid igniter, for example) and a secondary or prestage fuel injector 22 are associated with combustion chamber 20 and injector 16 for the ignition of mainstage propellants. Throat 23 and nozzle 24 form the balance of thrust chamber 14.

The total fuel displacement volume between main fuel valve 8 and injector 16 is substantially greater than the total oxidizer displacement volume between main oxidizer valve 9 and injector 16. When said main valves are opened substantially simultaneously under similar pressure conditions more time is consumed in filling the fuel displacement volume than in filling the oxidizer displacement volume. The result is a fuel injection lag with respect to oxidizer injection, or conversely, an oxidizer lead with respect to the fuel (heretofore described as a LOX lead).

In the operation of the present invention an inert fluid, e.g. water, is first introduced through valve 11 and line 10 into the fuel system ahead of fuel valve 8. The fuel system is thus filled to injector 16a. The proper inert fluid level may be indicated by the flow of fluid from the fuel orifices 18 of the injector. Valve 11 is then closed to prevent any further entry of inert fluid. Line 10 may be disconnected at valve 11 from the inert fluid source at this time if the rocket engine system is installed in a flyable airframe, or left connected if the engine is being statically tested. Valve 11 may be a commercially available automatic disconnect valve.

After the operator is satisfied that the fuel lines ahead of valve 8 are completely filled with inert fluid, igniter 21 is fired. At a predetermined ignition stage a signal is furnished through conventional signal means (not shown) to open oxidizer valve 9. Oxidizer is thereby furnished by gravity feed to oxidizer injector 16b and from there to combustion chamber 20. As oxidizer valve 9 leaves the closed position a signal is furnished (by a conventional signal means not shown) to an igniter fuel valve 25 which opens and allows a predetermined amount of fuel to enter prestage injector 22, be injected therefrom into the combustion chamber through orifices 18, and mix with the oxidizer. The flame and heat generated by igniter 21 immediately ignites the propellant mixture. This ignition phase is called prestage combustion. When combustion conditions are proper a mainstage signal is given, either automatically by an ignition detection device (not shown) or manually by the operator. This signal triggers the opening of fuel valve 8. Simultaneously with the opening of said fuel valve the operation of turbopump 5 begins, forcing fuel and oxidizer under full turbopump pressure through their respective lines and valves. Oxidizer, under full-flow immediately primes the oxidizer portion 16b of injector 16 and is injected into combustion chamber 20. Fuel, under full-flow traverses line 6 and is forced hydraulically against the inert fluid ahead of valve 8, forcing the inert fluid into any unfilled areas in fuel portion 16a of injector 16, thus priming the fuel injector. The inert fluid is injected through orifices 18 into combustion chamber 20. Alternately, the opening of oxidizer valve 9 and fuel valves 8 and 25, together with the actuation of the turbopump, may occur substantially simultaneously after the firing of igniter 21. The full-flow of oxidizer, fuel and inert fluid begins immediately. By the time the main fuel supply has forced the inert fluid from the fuel conduits and has itself arrived at the combustion chamber, prestage ignition has been fully established and conditions are proper for mainstage operation. The injection of inert fluid into a combustion chamber wherein combustion is being supported would normally be expected to quench the combustion, however, since separate fuel and oxidizer supplies are being mixed in combustion chamber 20 at this time, the flame produced therein is self-supporting, as is the flame from self-contained igniter 21.

The starting method of this invention entirely eliminates the negative conditions of the prior art full-flow method. As above illustrated there is little or no air space remaining between fuel valve 8 and injector 16 during any phase of rocket engine operation and therefore no possibility for the development of fuel vibration resultant from air compressibility. Since fuel portion 16a of the injector primes simultaneously with oxidizer portion 16b, it is filled with fluid during starting transients. There can therefore be no back flow of oxidizer into the fuel injector and no possibility of a flash back in the fuel portion of the injector. The inert fluid, in traversing the system also performs a purging function. Any oxidizer or foreign matter resting in the passageways into which the inert fluid is placed is automatically picked up by the inert fluid and removed from the system with the inert fluid prior to the arrival of the fuel. This purge also assists in eliminating the possibility of the premature mixing of fuel and oxidizer in the fuel passages and prevents a potential explosion hazard.

After all inert fluid has been forced from the fuel system ahead of the pressurized fuel, the fuel enters the injector and is injected into combustion chamber 20 without the danger of combustion instability development.

While water ($H_2O$) has been used continuously and successfully in the present starting method it does present a potential trouble source; i.e. the freezing of the water at some point in the fuel system. This possibility exists since the most commonly used oxidizers have extremely low temperatures. LOX, for example, has a temperature in the minus 300° F. range. If the water, particularly while in a static condition, were to remain for very long in proximity to such an oxidizer system with such a temperature range freezing would be rapid and system failure inevitable. It is, however, not necessary that the inert fluid remain in a liquid phase to such extreme temperature, since the fuel system is not directly and or continuously exposed to the oxidizer system. It has been found that a fluid is suitable for this application if it possesses the following characteristics:

(1) It must have an eutectic temperature (remain in a liquid phase) of at least —30° F.;
(2) It must be so fluid as to flow freely through the thrust chamber assembly at the required low starting temperature (approximately —30° F.);
(3) Its corrosiveness to materials wetted by it must be low;
(4) It must be non-combustible;
(5) It must not produce unsatisfactory thrust transients, combustion instability or thrust chamber damage.

Any inert fluids which can meet these tests are usable in this rocket engine starting method whether they be fluids of single or multiple constituents.

Consideration has been given to the study of inorganic salts for aqueous anti-freeze solutions whereby fluids which would not normally meet the requirements may be made acceptable. Two salts which have proven particularly adaptable, aqueous solutions thereof having met all tests, are calcium chloride and lithium chloride, with a corrosion inhibitor added.

Calcium chloride ($CaCl_2$) has been found to be most satisfactory when a commercial grade of anhydrous $CaCl_2$ is dissolved in distilled water until a concentration of 26.5% to 32% by weight $CaCl_2$ is obtained. The preferred concentration, however, is 29.8% $CaCl_2$. The 26.5% to 32% range provides an eutectic temperature which is consistently low enough (—30° F.) to meet the requirements of most low temperature engine starts, while the preferred 29.8% concentration has an eutectic temperature of —67° F. This latter concentration therefore provides a greater operational margin of safety than do other concentrations.

Lithium chloride (LiCl) provides a lower eutectic temperature than does $CaCl_2$. When a 22% to 32% by weight LiCl concentration is prepared from distilled water and commercial grade anhydrous lithium chloride an operational eutectic temperature below —65° F. may be achieved. By using a preferred concentration of 25% LiCl an eutectic temperature of —104.6° F. may be achieved.

Aqueous solutions of both $CaCl_2$ and LiCl must, in order to meet test No. 3 (non-corrosiveness), have a corrosion inhibitor added. It has been found that approximately 0.35% by weight of sodium chromate, when added to either solution, satisfactorily inhibits corrosion and makes the fluids fully acceptable as operable inert fluids for this invention.

While LOX has been described herein as the most commonly used oxidizer, most oxidizers are equally usable in the present starting method, as are a variety of fuels. Other examples of oxidizers which may be used are fluorine, mixtures of oxygen and fluorine, and whole hydrogen peroxide. Virtually all aromatic hydrocarbon fuels are usable. Commercial grades of alcohol known as RP fuels, jet fuels of the JP series, mixtures of unsymmetrical dimethyl hydrazine (UDMH) and dimethyltriamine (DETA) and hydrogen are examples of usable fuels. The fuels and oxidizers mentioned are by way of example only, the invention being fully capable of operation with other fuels and oxidizers.

Through the utilization of the invention disclosed herein rocket engineers have been enabled to successfully test numerous rocket engines under both static and f conditions without being plagued by combustion instab problems.

Although the invention has been described and i trated in detail, it is to be clearly understood that the s is by way of illustration and example only and is n( be taken by way of limitation, the spirit and scope of invention being limited only by the terms of the appe claims.

I claim:
1. A method of initiating propellent injection prej tory to starting a rocket engine having an injector, sot of liquid fuel and liquid oxidizer propellents, and duits connecting said propellent sources to said inje comprising substantially filling the fuel conduit witl inert liquid between said fuel source and said injector ; to actuation of said engine and pressure feeding propellents from said sources through said conduits said injector so as to hydraulically force the inert li through the fuel conduit and the injector ahead of the

2. A method for starting a rocket engine havin oxidizer system with an oxidizer valve in a conduit ing from an oxidizer tank to a propellent injector, a system with a fuel valve in a fuel conduit leading fr( fuel tank to the propellent injector, said propellent inj( and an ignition system being fixed within a thrust cl ber, comprising filling the fuel system between the valve and the injector with an inert liquid, initiating tion in the combustion chamber, opening the oxidizer fuel valves substantially simultaneously, pressure fee oxidizer and fuel from each of said tanks to said prope injector causing said fuel to force said inert liquid said fuel conduit, and initiating mainstage combusti( said thrust chamber after said inert liquid has been f( from said system whereby a stable rocket engine st; achieved.

3. A method for starting a rocket engine, compi substantially filling fuel passages ahead of a main valve with an inert liquid, initiating a self-sustaining bustion in a combustion chamber which communi with the fuel passages, injecting into the combustion c ber and mixing therein igniter fuel and oxidizer so cause the mixture to be ignited substantially simul ously with the said injection of said fuel and oxidizer, surizing main fuel and oxidizer supplies, subjecting inert liquid to pressurized fuel by opening the main valve to force the inert liquid out of the fuel pas and into the combustion chamber by the hydraulic a of system pressurized fuel on the inert liquid, whi the pressurized fuel follows the inert liquid into the bustion chamber in a stable manner and a vibratior mainstage combustion is initiated.

4. A method for initiating propellent flow in a rege tively cooled bi-propellent rocket engine having a system and an oxidizer system, comprising filling the system ahead of a main fuel valve with an inert li opening the main fuel valve and a main oxidizer in the oxidizer system to their full open positions stantially simultaneously, to force fuel and ox through their respective systems under full flow c tions, whereby the inert liquid is acted upon hy( ically by the fuel, the inert liquid priming the fu jector substantially simultaneously with the primii the oxidizer injector by the oxidizer, and the fuel jected after the inert liquid.

5. A method for starting a rocket engine, comp substantially filling fuel passages ahead of a mair valve in said passages with an inert liquid, initiat self-sustaining combustion in a combustion chamber ʋ communicates with said passages, introducing int( combustion chamber and mixing therein supplies o and oxidizer so as to cause the mixture to be ig pressurizing main fuel and oxidizer supplies, subj( said inert liquid to pressurized fuel by opening the fuel valve, to force the inert liquid out of the fue sages and into the combustion chamber by the hydraulic action of pressurized fuel on the inert liquid, forcing pressurized oxidizer into the combustion chamber substantially simultaneously with the introduction of the inert liquid, whereby the pressurized fuel follows the inert liquid into the combustion chamber in a stable manner and a vibration-free mainstage combustion is initiated.

6. A method for starting a rocket engine having a combustion chamber; an injector for injecting fuel and oxidizer into said combustion chamber; a fuel system and an oxidizer system leading to said injector, each of said systems having a main valve therein, and an ignition system, said method comprising; filling said fuel system between said main fuel valve and said injector with an inert liquid; firing an igniter in said combustion chamber; opening said main valves substantially simultaneously; pressure feeding the fluids from said fuel and oxidizer systems into said combustion chamber, said inert liquid entering said combustion chamber ahead of said fuel; and initiating mainstage combustion; whereby a smooth hydraulic fuel flow and a stable combustion condition are achieved.

References Cited in the file of this patent

UNITED STATES PATENTS

| | | |
|---|---|---|
| 2,479,888 | Wyld et al. | Aug. 23, 1949 |
| 2,532,708 | Goddard | Dec. 5, 1950 |
| 2,540,666 | Goddard | Feb. 6, 1951 |
| 2,558,483 | Goddard | June 26, 1951 |
| 2,630,674 | Goddard | Mar. 10, 1953 |
| 2,722,100 | Goddard | Nov. 1, 1955 |
| 2,738,648 | Ogle | Mar. 20, 1956 |